United States Patent

Kobayashi et al.

Patent Number: 5,099,733
Date of Patent: Mar. 31, 1992

[54] ROTARY KNIFE

[75] Inventors: Tatsunori Kobayashi; Mutsumi Yasutake; Junzo Koyasu; Makoto Hasegawa; Masayuki Inoue, all of Anpachi, Japan

[73] Assignee: Mitsubishi Materials Corporation, Tokyo, Japan

[21] Appl. No.: 429,932

[22] Filed: Nov. 1, 1989

[30] Foreign Application Priority Data

| Nov. 1, 1988 | [JP] | Japan | 63-143318 |
| Nov. 1, 1988 | [JP] | Japan | 63-143319 |
| Nov. 1, 1988 | [JP] | Japan | 63-277001 |
| May 12, 1989 | [JP] | Japan | 1-54765 |

[51] Int. Cl.$^5$ ............................................. B26D 7/06
[52] U.S. Cl. ................................. 83/425.3; 83/481; 83/500; 83/700
[58] Field of Search ............... 83/481, 425.3, 500, 83/700; 30/296.1; 403/DIG. 8, DIG. 9, 1, 5

[56] References Cited

U.S. PATENT DOCUMENTS 4,220,064  9/1980  Potter ........................ 83/481 X
4,485,710  12/1984  Schlisio et al. .............. 83/700 X Primary Examiner—Timothy V. Eley
Attorney, Agent, or Firm—Cushman, Darby & Cushman

[57] ABSTRACT

Disclosed is a hydraulically fixable flange, which is detachable by expansion and contraction of the internal bore employing hydraulic fluid, in which a hydraulic chamber is provided within the flange body, and a hole for supplying hydraulic fluid, which is connected to the outside from the hydraulic chamber, is also provided, together with valve system provided between the hydraulic chamber and the hole for supplying hydraulic oil so that the system can supply pressurized oil to the hydraulic chamber from outside. Also, there is disclosed a rotary knife provided with the hydraulically fixable flange.

3 Claims, 11 Drawing Sheets

ROTARY KNIFE

BACKGROUND OF THE INVENTION

1. Field of the Invention

This invention relates to a hydraulically fixable flange as well as to a rotary knife used as upper and lower pair with the hydraulically fixable flange, which are used when disc-shaped rotary knives, grinding wheels, gears, cutters and a like are fitted on the shaft, or when the shaft is used in tools like end mills, drills, jigs, positioning devices and the like fixed to fitting holes.

2. Description of the Prior Art

Such art as shown in FIG. 1 is conventionally known as a hydraulically fixable flange of this kind, wherein a ring-shaped tool 104 is fixed to one end of the periphery of a flange body 100 with a bolt 102. An annular hydraulic chamber 106 is formed within the flange body 100, and a piston 112 with a movable O-ring 110 is mounted in a radial direction from a flange body 100 within the piston chamber 108 connected to this hydraulic chamber 106. A set screw 118 is fastened at the center of a hollow cover 116 which is fixed to the flange body 100 by a bolt 114.

In such conventional hydraulically fixable flanges the pressure of pressurized oil within the hydraulic chamber 106 is increased with the piston 112 pressed onto the side of the hydraulic chamber 106 by screwing the set screw 118. The bore of the flange body 100 is contracted to provide the prescribed tightening force required for clamping.

However, the space with the shaft is larger or the fixing force is higher in the conventional hydraulically fixable flange. Thus, the number of pistons 112 must be increased, because the amount of oil to be supplied to the hydraulic chamber 106 by the movement of the piston 112 becomes less when the pressure in the hydraulic chamber 106 is caused to increase, or when the width of the flange becomes wider. Consequently, there is insufficient rigidity and strength of the flange body 100' which requires higher accuracy and a larger number of parts leading to economic disadvantages. Another drawback is that the volume of oil enclosed within the flange body 100 may change during the summer and the winter due to expansion and contraction of oil caused by temperature variances, which weakens the clamping force and makes the fixing impossible, or it becomes hard to attach and detach because of the contraction of the bore in advance.

SUMMARY OF THE INVENTION

It is an object of this invention to overcome the above drawbacks, and provide a hydraulically fixable flange, which facilitates supply of pressurized oil from the outside, and that has individual components can be designed as compact as possible without causing any problem in the amount of oil to be supplied to the interior of the hydraulic chamber, so that the machining of the flange body; which would have a greater influence over the strength, accuracy, and rigidity of the flange, can be minimized. Also the release of pressure and hydraulic oil can be easily performed by means of a valve mechanism.

To solve the above-mentioned problems, in one aspect, the present invention provides a flange wherein the hydraulic chamber is provided within the flange body. A hole for supplying hydraulic oil, which is connected to the outside of the chamber, is also provided, together with a valve system placed between the hydraulic chamber and the hole for supplying hydraulic oil so that the system can supply pressurized oil to the hydraulic chamber from the outside.

In another aspect, the present invention provides a rotary knife composition wherein the hydraulic chamber is provided within the flange body, and a hole for supplying hydraulic oil, which is connected to the outside of the hydraulic chamber is also provided, together with a valve system placed between the hydraulic chamber and the hole for supplying hydraulic oil so that the system can supply pressurized oil to the said hydraulic chamber from the outside; a ring-shaped tool is mounted on the outer periphery of the flange body which is fitted on the outer periphery of the shaft before it is fixed on the said shaft by contracting the bore of the inner circumference of the flange body by feeding pressurized oil to the hydraulic chamber formed within the flange. Multiple ring-shaped tools are mounted on the outer periphery of the flange body at prescribed intervals in an axial direction of the shaft.

BRIEF DESCRIPTION OF THE ATTACHED DRAWINGS

DESCRIPTION OF THE PREFERRED EMBODIMENT

In the first embodiment of this invention, there is provided in the hydraulic chamber a movable piston regulating the hydraulic oil of the chamber and an elastic body provided to this piston to urge the piston onto the side of the hydraulic chamber.

Moreover, in a variation of the first embodiment, the piston regulating the hydraulic oil of the chamber is movable within a prescribed range in the hydraulic chamber, and an elastic body is supplied to this piston to urge the piston onto the side of the hydraulic chamber.

In a further variation of this invention, a preload monitor is provided to the piston so that the piston can freely extend to the flange body and then can retract.

In the hydraulically fixable flange of this invention, pressurized oil is supplied to the hydraulic chamber through the hole for supplying hydraulic oil from outside by means of valve system when the pressure within the hydraulic chamber is lower, while pressurized oil is discharged outside by means of the valve system when the pressure in the hydraulic chamber is released.

Again as in the first embodiment, changes in pressure in the hydraulic chamber are minimized to the lowest point possible by moving the piston with an elastic body so that fastening power is stabilized.

As in the first variation of the first embodiment, the piston left free to move about within the prescribed range is pressed to the side of the hydraulic chamber by means of an elastic body, the pressure therein will be at the preset level as if no elastic body were set, and if the prescribed pressure is exceeded, the elastic body will become active to reduce whatever change might occur in the hydraulic pressure.

As in the second variation of the first embodiment, the pressure in the hydraulic chamber can easily be known by transmitting the movement of the piston to the outside by way of a preload monitor.

In the second embodiment, two or more ring-shaped tools are attached to the outer periphery of the flange body to allow them to mutually offset shearing force to which they are exposed. This reduces the force of thrust that works between the flange body and the shaft and makes it possible to cut a thick plate.

If ring-shaped tools are arranged at smaller intervals for narrower cutting, it is possible to lengthen the width of the flange and widen the hydraulic chamber without shortening the flange width as before.

EXAMPLES

Figure 2:
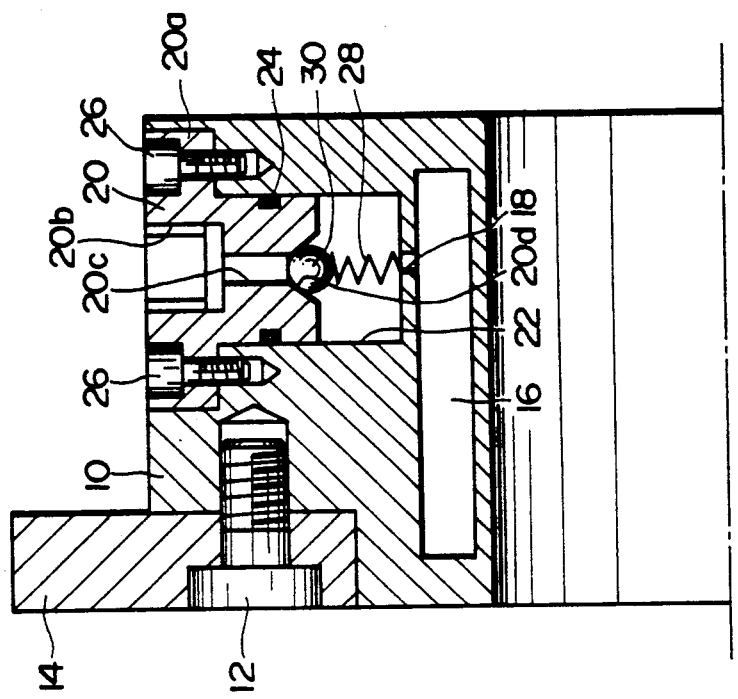
FIG. 2 shows a cross-sectional view of the first embodiment of the present invention.
Figure 3:
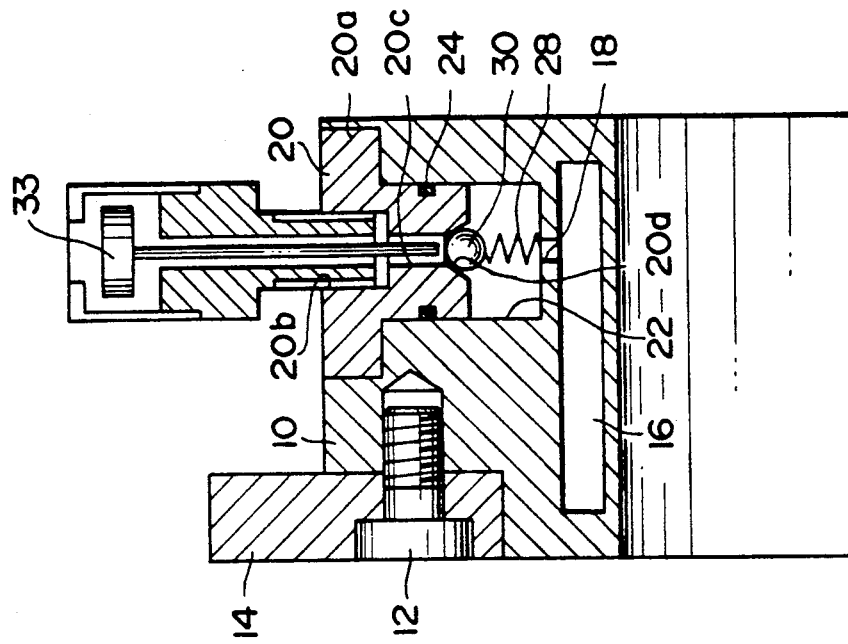
FIG. 3 shows a cross-sectional view of the hydraulic pressure chamber according to the first embodiment as the chamber is fed with pressure oil.
Figure 4:
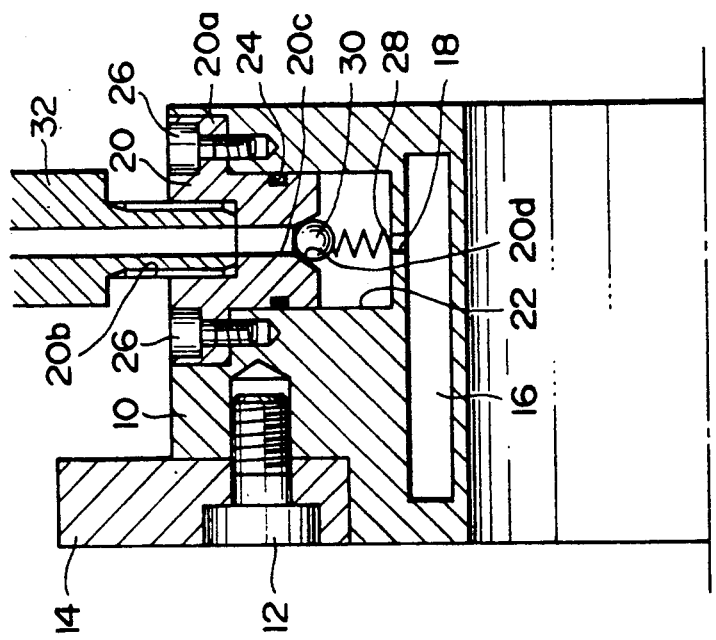
FIG. 4 shows a cross-sectional view of the chamber according to the first embodiment as it is emptied of pressure oil.

Illustrated in the drawings are examples of the hydraulically fixable flange of this invention as shown in FIG. 2 through FIG. 15. FIG. 2 through FIG. 4 show the first embodiment of this invention. In these figures, reference numeral 10 refers to a loop-shaped flange body. Ring-shaped tool 14 is fastened with bolts 12 to one edge of the periphery of this flange body 10. Circular hydraulic chamber 16 is formed within the above flange body 10. Formed in the space between the above hydraulic chamber 16 and the periphery of the flange body 10 are a communicating hole 18 and fitting hole 22 into which is installed an external hydraulic pressure supply unit.

When flange 20a is formed on the edge of external hydraulic pressure supply unit and O-ring 24 is fitted to the periphery on the other end, supply jig fixing hole 20b, communicating hole 20c and valve seat 20d are formed in turn on the section from one end of the inside to the other end. The above external hydraulic pressure supply unit 20 is fixed to the flange body 10 by fastening the bolt 26 inserted into flange 20a. The spring 28 is set inside of the installation hole 22 on the above flange body 10. The ball 30 urged by this spring 28 is pressed hard against the valve seat 20d on the above external hydraulic pressure supply unit 20.

In the case of the hydraulically fixable flange composed as described above, if supply jig 32 is fitted into supply jig hole 20b of the external hydraulic supply unit 20, as hydraulic pump by way of the coupler, the supplied pressure oil, working against the force of the spring 28, forces down the ball 30 pressed against the valve seat 20d by way of the communicating hole 20c of the external hydraulic pressure supply unit 20, and then finds its way to the hydraulic chamber 16 through fitting hole 22 and the communicating hole 18. Consequently, the pressure within the hydraulic pressure chamber 16 can be raised easily to the prescribed level. Therefore it is possible to securely insert the shaft inside the flange body.

If the pressure in the hydraulic pressure chamber 16 is to be released, as indicated by FIG. 4, pin 33 is pressed through the communicating hole 20c of the external hydraulic pressure supply unit 20 and pushes down the ball 30, thereby overcoming the force derived from the spring 28. Thus, instant discharge of the oil from hydraulic pressure chamber 16 occur.

Figure 5:
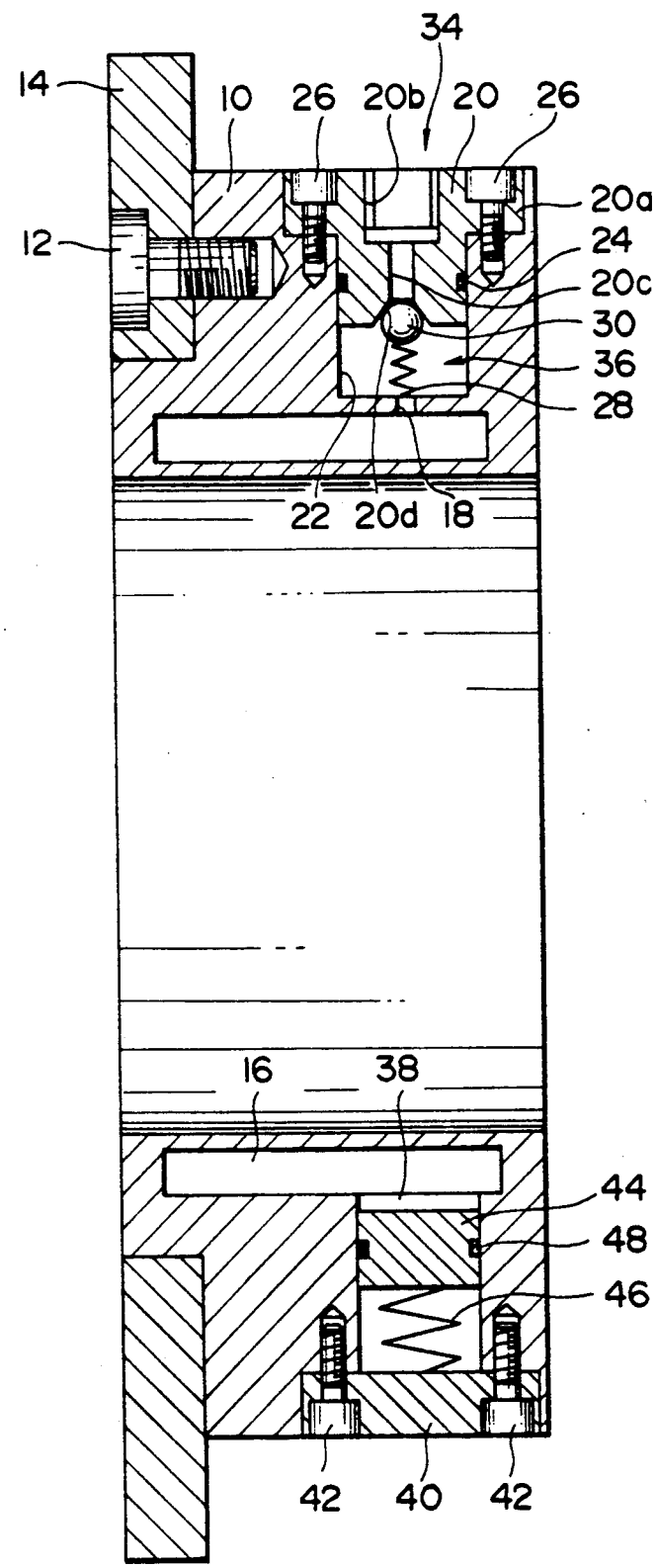
FIG. 5 is a cross-sectional view of the second embodiment of the present invention.
Figure 6:
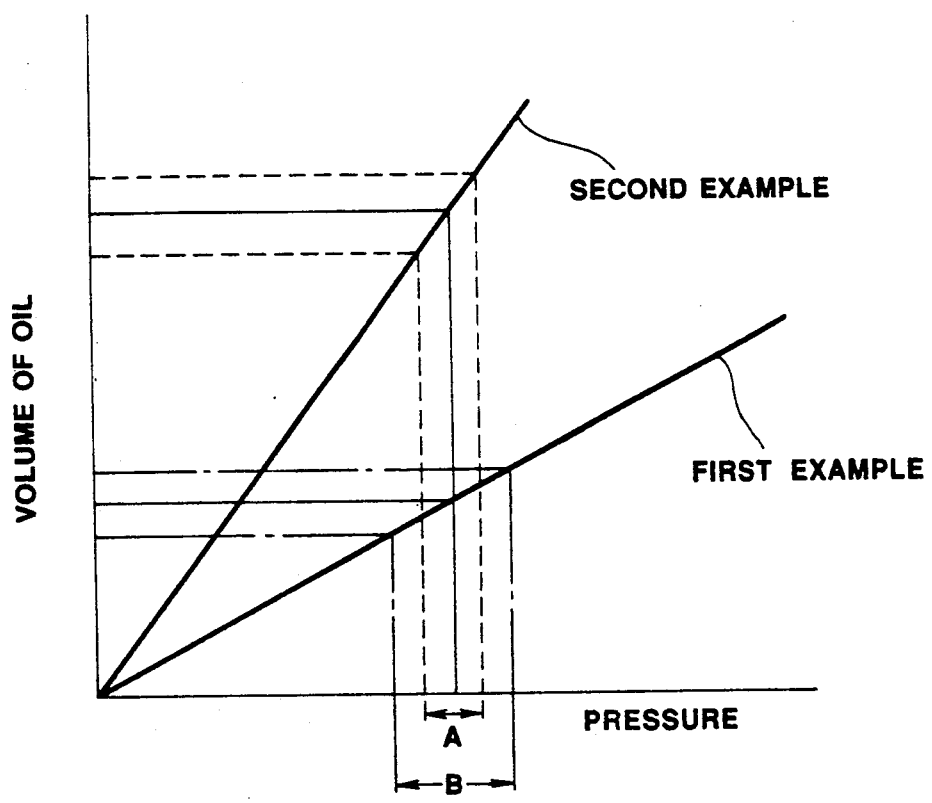
FIG. 6 is a diagram illustrating the relation between oil volume and pressure in the first and second embodiments of the present invention.

FIG. 5 shows the second example of application of this invention. As for the parts with the same composition as in the first example, illustrated by FIG. 2 through FIG. 4, the same reference numerals are attached to them, with the explanation omitted. In this second example, oil pressure supply hole 34 and the valve mechanism 36 are provided, as shown by FIG. 5. In other words, the communicating hole 18 and the fitting hole 22 to install external hydraulic supply unit 20 are formed between the above hydraulic pressure chamber 16 and the periphery of the flange body 10. When flange 20a is formed on the edge of the external hydraulic pressure supply unit and O-ring 24 is fitted to the periphery on the other end, supply jig fixing hole 20b, communicating hole 20c and valve seat 20d are formed in turn on the section from one end of the inside to the other end. The above external hydraulic pressure supply unit 20 is fixed to the flange body 10 with a fitting bolt 26 inserted into the flange 20a. The spring 28 is set inside fitting hole 22 on the above flange body 10. The ball 30 forced by this spring 28 is pressed hard against valve seat 20d on the above external hydraulic pressure supply unit 20.

The piston chamber 38 is linked up to the above hydraulic chamber 16 and this piston chamber 38 is sealed up by cover 40a fixed with the fastening bolt 42. Inside the above piston chamber 38 piston 44 is arranged to slide freely to and from the hydraulic chamber 16, and also the spring 46 gives additional force to throw this piston 44 to the side of hydraulic chamber 16. Numeral 48 on FIG. 5 refers to an O-ring.

With the hydraulic pressure fixed flange composed as described above, if the supply jig is fitted to supply jig hole 20b of the external hydraulic pressure supply unit 20 and pressure oil is supplied from the hydraulic pump, in the same way as in the first example, the pressure in the pressurized oil chamber can easily be raised to the prescribed level.

If there should be a temperature difference between the above supplied pressure oil and the flange body 10 in this situation (normally the temperature rises because of use of a hydraulic pump, but sometimes it falls), or if there should be a change in the quantity of oil owing to oil leakage, the piston 44, with additional force from the spring 46, slides back and forth within the piston chamber 38, absorbing the above change, thereby minimizing the pressure fluctuations in the hydraulic chamber 16. Therefore, it is possible to keep the fastening power stable (see fluctuation range A and B on FIG. 6).

In order to release the pressure within the hydraulic chamber 16, it is only necessary to push a pin into the inside of the hydraulic pressure supply unit 20 so that the pressurized oil in the hydraulic chamber 16 can be instantaneously discharged to the outside to release pressure.

FIG. 7 through FIG. 10 illustrate the third example of application of this invention. In this third example, the same numerals are assigned to those parts shown on FIG. 2 as in the first and second examples, and therefore the explanation is omitted here.

Figure 7:
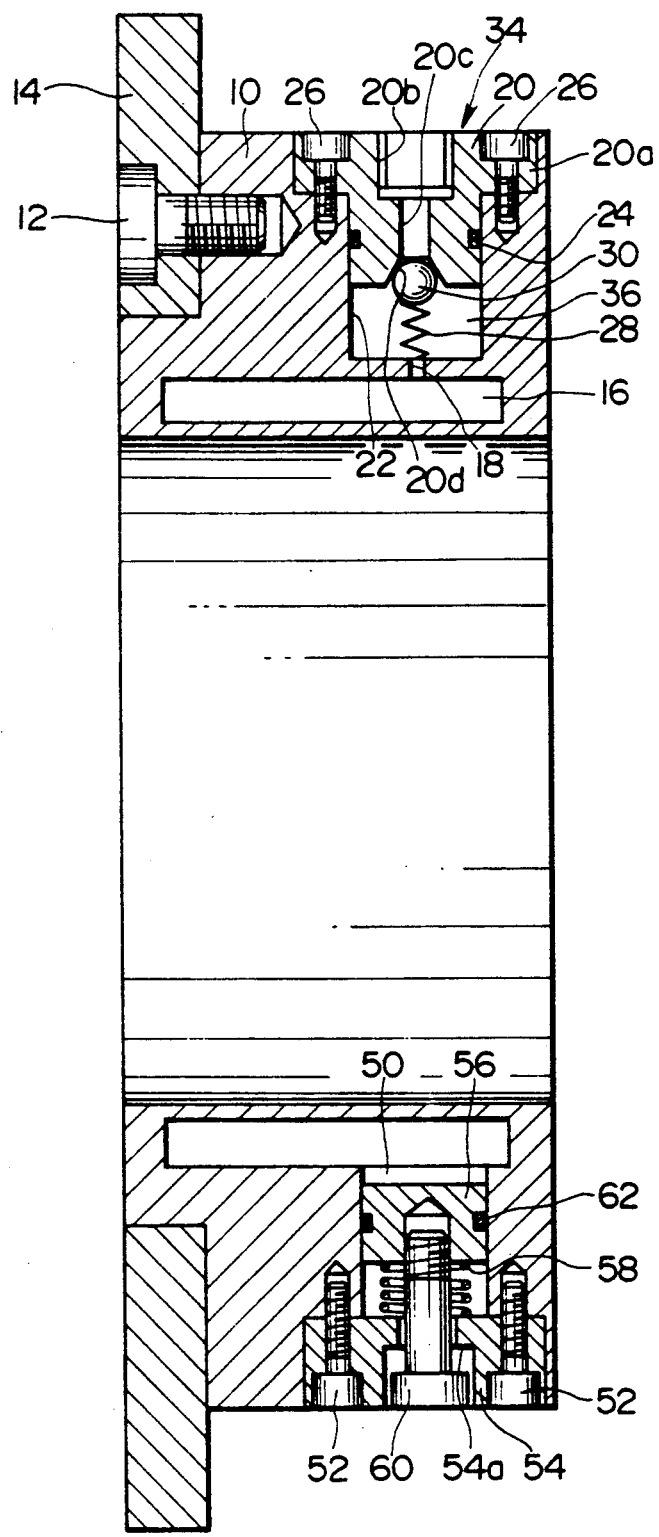
FIG. 7 is a cross-sectional view of a third embodiment of the present invention.
Figure 8:
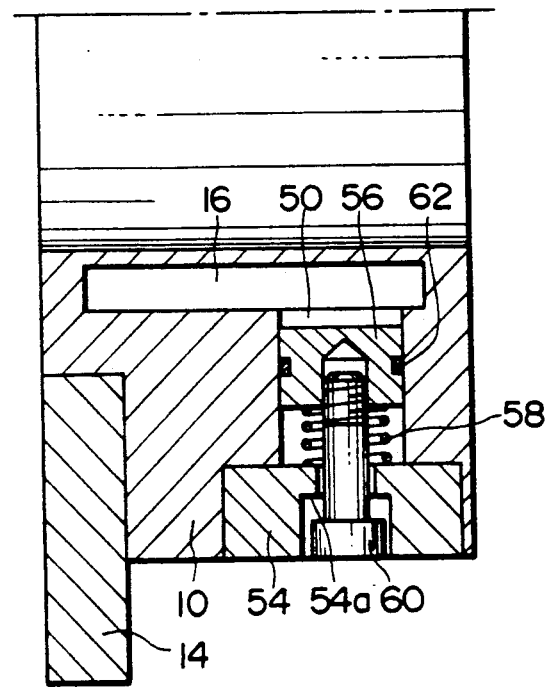
FIG. 8 is an illustration of the head of the preload setting bolt on the same plane with the cover of the third embodiment.
Figure 9:
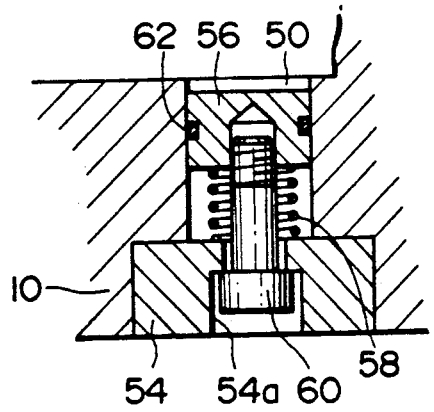
FIG. 9 is an illustration of the head of the preload setting bolt drawn toward the hydraulic pressure chamber of the third embodiment.
Figure 10:
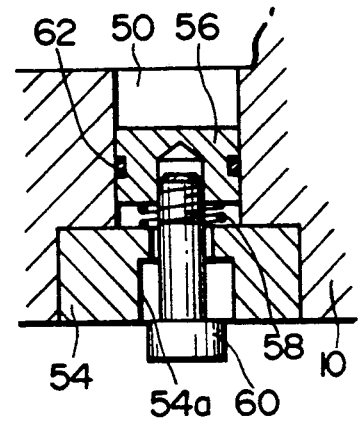
FIG. 10 is an illustration of the head of the preload setting bolt protruding from the cover of the third embodiment.

In this third example, there are hydraulic pressure supply hole 34 and valve mechanism 36, as indicated in FIG. 7. Moreover, piston chamber 50 is linked up with the above hydraulic chamber 16. The external opening of this piston chamber 50 is fitted with cover 54 fixed by fastening bolt 52. Inside the piston chamber 50, there is provided a piston 56 set to freely slide toward and away from the hydraulic chamber 16. There is also the spring 58 attached to push this piston 56 toward the side of the hydraulic chamber 16. Preload setting bolt 60 is screwed into the above piston 56 while passing through the above preload setting bolt 60 arranged to freely pop up or down into the fixing depression on the above cover 54. Numeral 62 in FIG. 1 refers to an O-ring.

With the hydraulically fixable flange composed as above, it is easy to raise pressure within the hydraulic pressure chamber 16 to the prescribed level by fitting the supply jig into the supply jig fixing hole 20b of the external hydraulic pressure supply unit 20, as in the first and the second examples, and by supplying pressure oil from the hydraulic pump.

Figure 11:
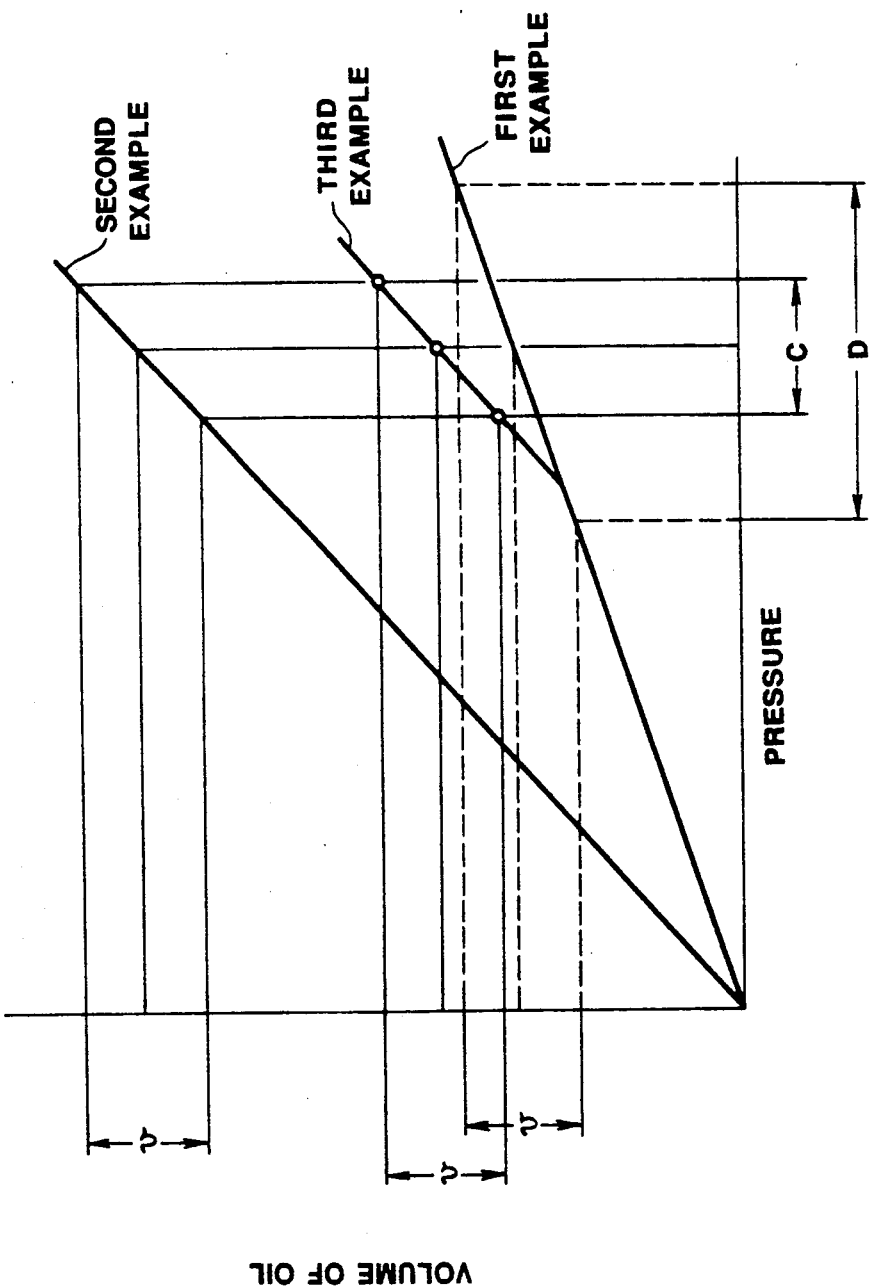
FIG. 11 is a diagram illustrating the pressure fluctuations in response to changes in oil volume in the first, second and the third embodiments.

In this case, the situation is as if there were no spring 58 set against the piston 56, in the piston chamber 50, begins moving against the urging force provided by the spring 58 (See FIG. 9), and, as shown in FIG. 11, the pressure rises as described in FIG. 2. Then, when the pressure in the hydraulic pressure chamber rises above the prescribed level, the piston 56 in the piston chamber 50 begins moving against the additional force emanating from the spring 58. Accordingly the head of the preload setting bolt 60 moves outwards within the fixture depression 54a of the cover 54 (see FIG. 8) and protrudes outwardly (see FIG. 10). Consequently, the pressure within the hydraulic pressure chamber 16 can easily be known by checking the position of the head of the above preload setting bolt 60 from the outside.

In the situation where the above-described spring 58 is acting, if there is difference in temperature between the above supplied oil pressure and the flange body 10 (normally the temperature rises because of use of a hydraulic pump, but sometimes it drops), or if there is a change in oil, additional force provided by the spring 58 causes the piston 56 to slide within the piston chamber 50, absorbing the above change and pressure in the hydraulic chamber 16. Therefore the fastening power can be kept stable (See fluctuation range C and D in FIG. 11).

If release of the pressure within the hydraulic chamber 16 is desired, a pin inside the external hydraulic pressure supply unit 20 is pushed as in the first and the second examples. Then, pressure oil can be instantaneously discharged to the outside from the hydraulic chamber 16 to release the pressure.

As shown above, since preloaded spring 58 (elastic body) is built-in in this third example of application, the same behavior can be noted as in the absence of an elastic body until the pressure reaches the point equivalent to the preload. Where the pressure exceeds the level comparable to the preload, the elastic body acts, causing the necessary amount of oil to increase a little compared with the first example of application shown on FIG. 2. The same effect as in the presence of an elastic body will be produced on the change of hydraulic pressure. Since the position of preload setting bolt 60 indicates the level of pressure within the hydraulic chamber 16, it is possible to monitor the fastening power at work from outside.

Besides, in this third example, the head of the preload setting bolt 60 comes into contact with installation depression 54a of the cover 54 (see FIG. 9) to apply a preload upon the piston 56 so as not to move farther toward the hydraulic chamber 16. It is also permissible to fit a stopper at a position in the piston chamber 50 near the hydraulic chamber 16 and put the piston 56 onto this stopper in order to prevent the piston 56 from moving nearer to the hydraulic pressure chamber 16.

Figure 12:
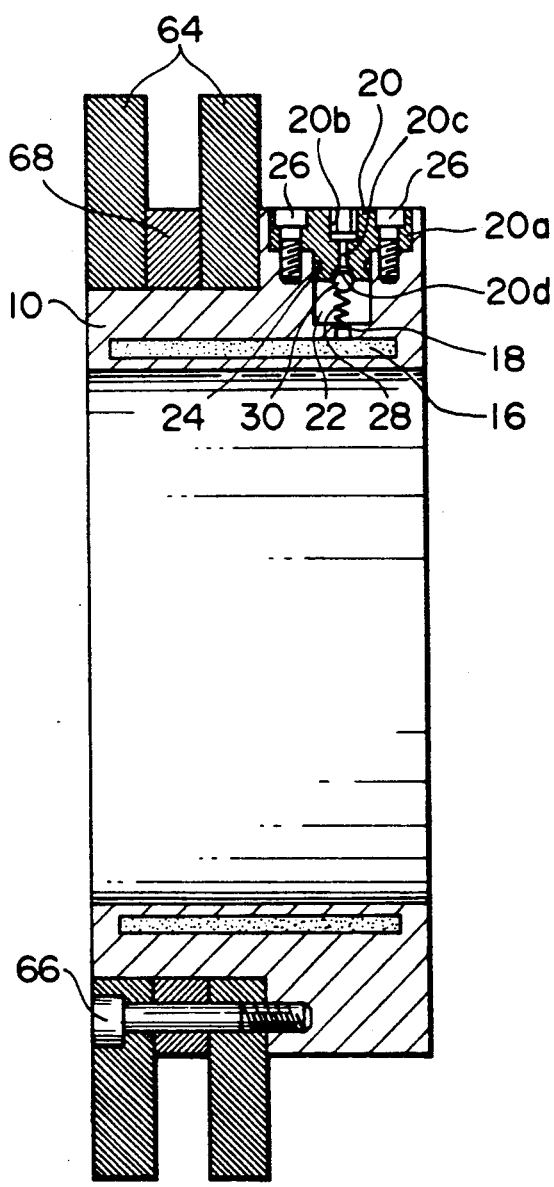
FIG. 12 is a cross-sectional view and FIG. 13 is a cross-sectional view of the present invention in a preferred state of use.
Figure 13:
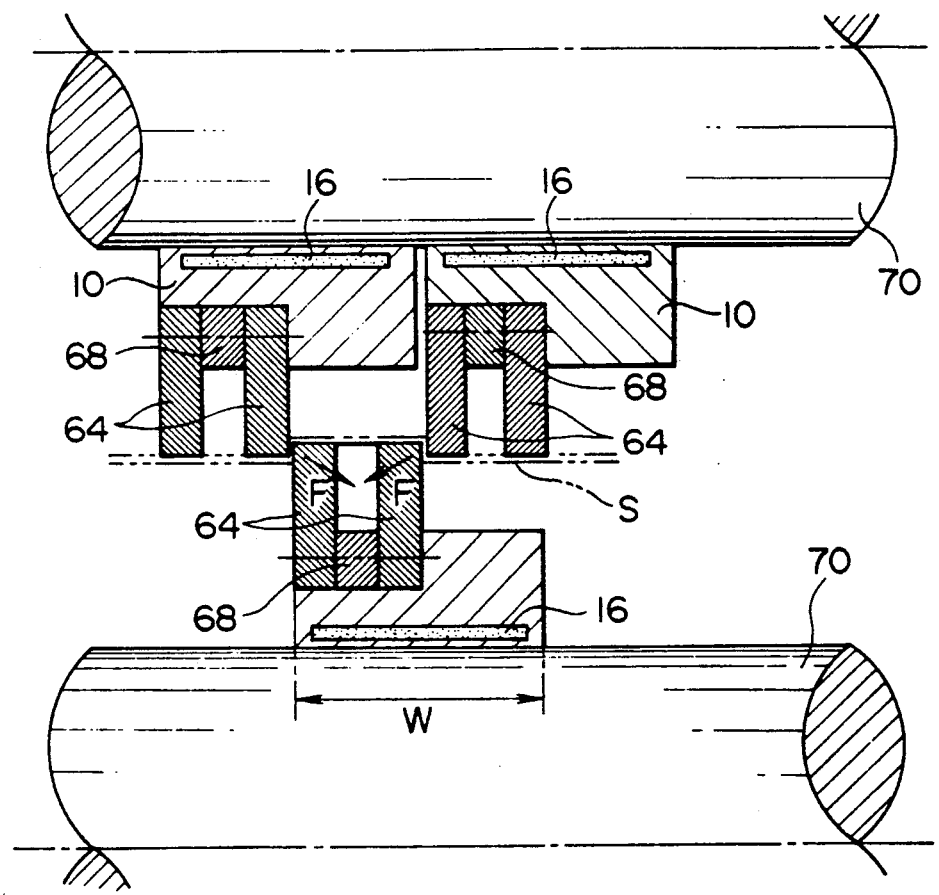
Figure 14:
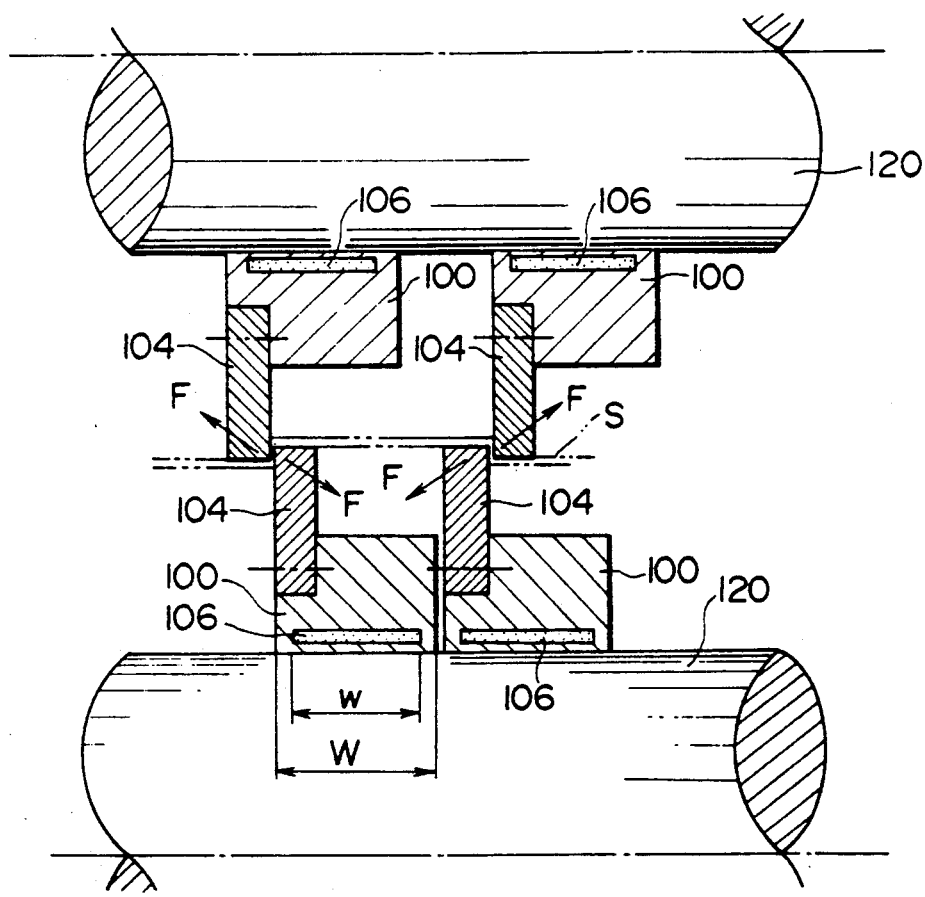
FIG. 14 is a cross-sectional view of the rotary knives during use of the hydraulically fixable flange as shown in FIG. 1.

Shown in FIG. 12 and FIG. 13 are the fourth example of application of this invention. This fourth example uses a hydraulically fixable flange as described in the first example. Since this part has the same composition, only the identical numerals are attached and the explanation is omitted.

The rotary knife in the fourth example composed of two pieces of ring-shaped tool 64 fitted to the flange body. The installation bolt 66 is used to fix the two tools 64. A ring-like spacer 68 is placed between the two tools 64. The presence of this spacer 68 keeps the two tools 64 fitted along the direction of the axis of the shaft 70 at a certain interval.

A pair of rotary knives, one above and the other below, are used to cut sheet-like workpiece S as shown in FIG. 13.

Figure 1:
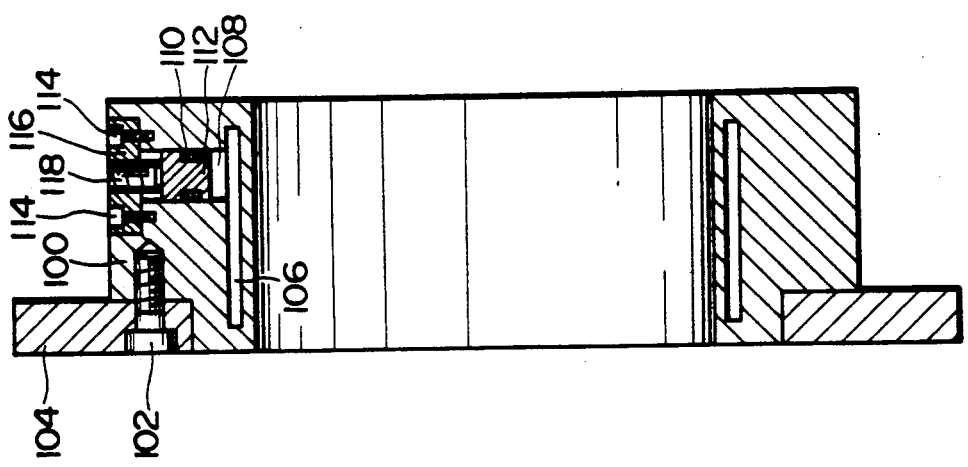
FIG. 1 is a cross-sectional view of the prior art hydraulically fixable flange.

To compare this fourth example with another example of using one piece of ring-shaped tool 104 fitted to the flange body 10 to cut a sheet-like workpiece S, as shown on FIG. 1, it is necessary to narrow the width W of the sheet-like workpiece S in a strip with the composition of one piece of ring-shaped tool 104 is attached to the flange body 10. In this case the following problems arise:

(1) Smaller width (W) of flange body 100 will inevitably mean a narrower range for the hydraulically driven clamp and no greater clamping power will be obtained.

(2) With a smaller width (W) of the flange body 100, it will be difficult in terms of space to design the piston 112 to give necessary hydraulic pressure to the clamp, and consequently the strength and rigidity of the flange body 100 will be reduced.

(3) If the flange body 100 is smaller in width, the outer diameter of the shaft 120 and the width of the flange body 100 will have poor balance, and the deflection accuracy of the rotary knives will drop.

Yet, in the above fourth example, two ring-shaped tools 64 attached to flange body 10 face cutting resistance F in an inverse direction, as shown on FIG. 13. Therefore, two opposed directions of cutting resistance F offset each other with a weaker thrust force applied onto the flange body 10. This means that a small amount of clamping power is required of the hydraulic chamber 16.

In cutting a sheet-like workpiece S into narrow strips, there is no need to narrow the width of the flange body 100 as before. The operator has only to narrow the space between two ring-shaped tools attached to the flange body 10.

Consequently, the flange body 10 can become wider, helping to raise the deflection accuracy of the rotary knives, and it is easier to obtain a wider space for external hydraulic pressure supply unit 20.

Figure 15:
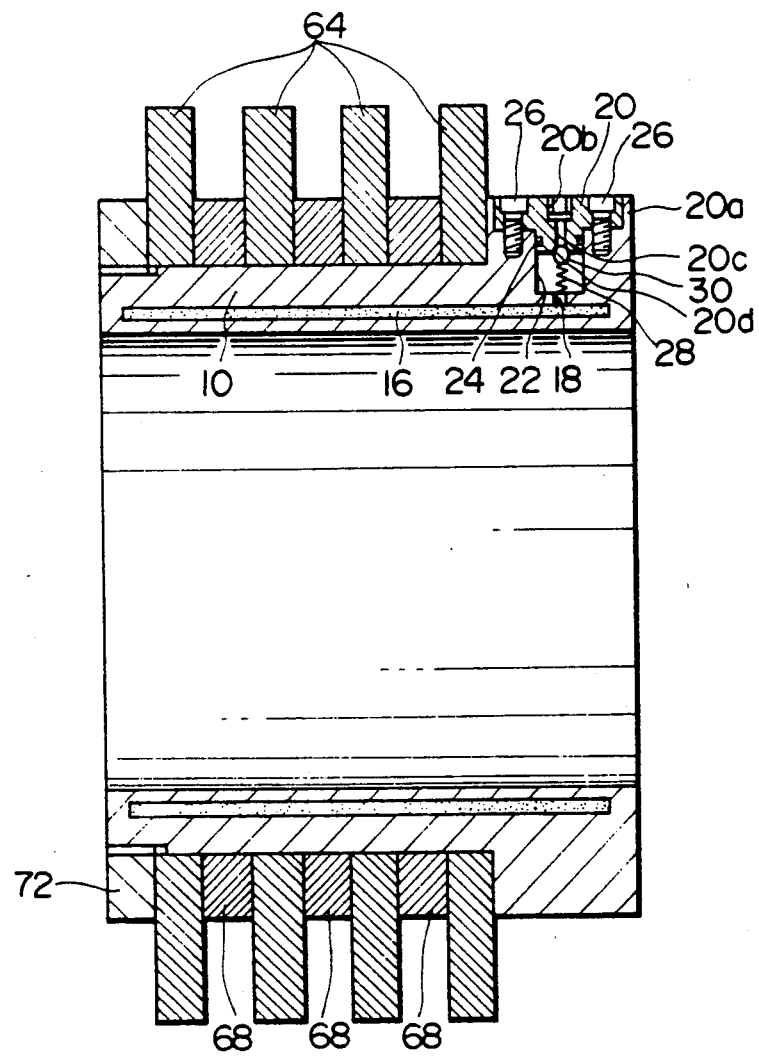
FIG. 15 is a cross-sectional view of the fifth embodiment of the present invention.

Set forth on FIG. 15 is the fifth example of application of this invention. This diagram shows an example of the flange body 10 fitted with four ring-shaped tools 64. Three ring-shaped spacers 68 determine intervals among the four ring-shaped tools 64 arranged in the direction of the axis of the shaft 70. The nuts 72 are used to fasten the ring-shaped tools 64.

Needless to say, any desired number of ring-shaped tools 64 can be fitted to the flange body 10 and can be positioned at any intervals desired.

As described above, the first embodiment of this invention discloses a hydraulic chamber within the flange body, and a hydraulic pressure supply porthole runs through the chamber to the outside. A valve mechanism is installed between the above hydraulic pressure chamber and the hydraulic pressure supply hole, enabling the feeding of pressure oil into the chamber from the outside. Since both the supply of pressure oil into the chamber and the release of pressure therefrom become smooth with the opening and closing operation of the valve mechanism, it is possible to design smaller individual parts to the necessary minimum size (smaller parts can withstand all the more greater pressure) without any worry about oil quantity within the hydraulic pressure chamber. Consequently it becomes possible to reduce the machining of the flange body to the necessary minimum level, which will adversely affect its strength, precision and rigidity and it is also possible to make a flexible response to the need for larger units.

The second embodiment of this invention, in connection with the above-described effects, shows the arrangement of the piston to regulate the hydraulic pressure in the hydraulic pressure chamber and freely move about there and an elastic body to thrust the piston to the side of the above hydraulic pressure chamber. Even in the case of a change in the quantity of oil due to temperature change, oil volume fluctuations or oil leakage, it is possible to reduce the likely change in the pressure within the hydraulic pressure chamber by moving the piston by means of the elastic body and consequently retain stable fastening force.

In the first variation of this invention, stating the effects similar to those described with respect to the first embodiment, the pistons are arranged to regulate the hydraulic pressure in the hydraulic pressure chamber and move freely within the prescribed bounds and an elastic body is installed to thrust the piston to the side of the above hydraulic chamber. With the above described piston pressed toward the hydraulic pressure chamber by the elastic body, the within the hydraulic pressure chamber finds itself in a situation similar to one created with no elastic body provided up. If the pressure exceeds the preset level, the elastic body begins functioning, minimizing the pressure change even in the case of a fluctuation of oil quantity due to temperature-caused oil volume changes or oil leakage. It is also possible to retain stable fastening force with a minimum amount of oil and to produce a quick and smooth disconnecting action.

Besides the effects described in the aforesaid first variation, the second variation of the first embodiment of this invention provides the preload monitor to the piston and arranges it to freely pop up into the flange body. The preload monitor indicates the transfer of the piston and enables the operator to readily know the pressure in the hydraulic pressure chamber and safely confirm the fastening force.

The rotary knives in the second embodiment of the invention are fixed to the shaft when the internal boundary of the flange body is shortened by supplying pressure oil into the hydraulic pressure chamber formed within the above flange body. A hydraulic pressure supply hole is run through the hydraulic pressure chamber to reach the outside with a valve mechanism placed between the chamber and the hole to enable the pressure oil to be fed into the chamber from the outside. Ring-shaped tools are lined up along the periphery of the flange body at certain intervals in the direction of the axis of the shaft. The cutting force which one tool is exposed to is offset by that of another, which reduces the force of thrust at play between the flange body and the shaft and makes it possible to cut a thick plate. When the ring-shaped tools are arranged at smaller intervals in order to cut narrow pieces, it is possible to enlarge the width of the flange body and create a greater pressure oil chamber.

What is claimed is:

1. A rotary knife comprising:
a flange body having an internal surface and an external surface, the internal surface defining a cylindrical hollow space for receiving a shaft therethrough and the internal surface being deformable so as to vary the diameter of the cylindrical hollow space, the flange body having therein:
an oil chamber for receiving pressurized oil and for deforming the internal surface of the flange body radially inward in response to an introduction of pressurized oil therein so as to firmly attach the flange body to the shaft;
an oil fed line formed through the flange body so that the oil chamber communicates with an external feeding means;
a valve located along the oil feed line for controlling oil flow through the oil feed line; and
a plurality of rotary cutting knives installed at the external surface of the flange body, the rotary cutting knives maintaining a distance between one another along the longitudinal direction of the shaft.

2. A rotary knife according to claim 1, wherein the oil chamber is provided with a movable piston for defining a wall of the oil chamber and an elastic member for urging the piston in one direction so that the piston is displaced according to the introduction of pressurized oil into the chamber thereby regulating the pressure of oil in the oil chamber.

3. A rotary knife according to claim 2, wherein the rotary knife is provided with a load monitor that indicates the pressure of oil in the oil chamber by protruding out of the flange body in accordance with movement of the piston.

* * * * *